United States Patent [19]

Muraoka

[11] Patent Number: 4,949,282
[45] Date of Patent: Aug. 14, 1990

[54] DEVICE FOR CALCULATING THE MOMENTS OF IMAGE DATA

[75] Inventor: Yutaka Muraoka, Hachioji, Japan

[73] Assignee: Fanuc Limited, Minamitsuru, Japan

[21] Appl. No.: 221,250

[22] PCT Filed: Nov. 11, 1987

[86] PCT No.: PCT/JP87/00876
§ 371 Date: Jun. 28, 1988
§ 102(e) Date: Jun. 28, 1988

[87] PCT Pub. No.: WO88/03683
PCT Pub. Date: May 19, 1988

[30] Foreign Application Priority Data

Nov. 12, 1986 [JP] Japan .................................. 61-269447

[51] Int. Cl.⁵ .................... G06F 15/70; G06K 9/52
[52] U.S. Cl. .................... 364/518; 364/724.05; 364/728.05; 382/28; 382/41; 382/48
[58] Field of Search ............ 382/25, 27, 28, 41, 382/48; 364/724.05, 724.19, 734, 521, 518, 728.05, 724.12

[56] References Cited

U.S. PATENT DOCUMENTS

| | | | |
|---|---|---|---|
| 3,292,148 | 12/1966 | Giuliano et al. | 372/41 |
| 4,339,803 | 7/1982 | Michael et al. | 364/724.05 |
| 4,550,432 | 10/1985 | Andersson | 382/1 |

FOREIGN PATENT DOCUMENTS 41014 5/1977 Japan .
204966 10/1982 Japan .
197972 3/1984 Japan .

*Primary Examiner*—Gary V. Harkcom
*Assistant Examiner*—Raymond J. Bayerl
*Attorney, Agent, or Firm*—Staas & Halsey

[57] ABSTRACT

A device for calculating the moments of image data has a plurality of image frame memories. The device has an image frame memory (12) for storing original image data, an image frame memory (13) for storing processed data, and image frame memories (13, 14) for storing weight data in includes an adder(7) for processing the data stored in these memories, a multiplier (6) for multiplying the data in the image frame memories, and an accumulator (8) for temporarily storing calculating results. These memories and the arithmetic units such as the adder (7) and other serve to calculate the zero-order, primary, and secondary moments of image data.

8 Claims, 2 Drawing Sheets

DEVICE FOR CALCULATING THE MOMENTS OF IMAGE DATA

BACKGROUND OF THE INVENTION

1. Field of the Invention

The present invention relates to a device for the moments of image data, and more particularly to a device for calculating the moments of image data at high speed through a simple arrangement.

2. Description of the Related Art

It is widely known to process image data by determining its moments in order to detect information represented by the image data. The moments of image data used include a zero-order moment, a primary moment, a secondary moment, and the like.

The zero-order moment is used to recognize the brightness of an image, the primary moment the position of a one-dimensional object, and the secondary moment the two-dimensional positional information of an object. In order to determine these image data moments, as many calculations as the number of pixels have to be carried out. Hence a vast amount of data must be processed, thus requiring a high-speed processing device. Since it would be impractical in terms of time consumption to process such image data with an ordinary computer through implementation of software, an image processing engine is used as special image processing hardware for processing the image data.

The image processing engine which has heretofore been used is however problematic in that it has a considerably complex structure because it processes image data in versatile applications.

SUMMARY OF THE INVENTION

It is an object of the present invention to provide a device for calculating the moments of image data at high speed through a simple arrangement.

In order to eliminate the aforesaid problems, there is provided in accordance with the present invention a device for calculating the moments of image data, comprising: an image frame memory for storing original image data; an image frame memory for storing processed data; an image frame memory for storing weight data in a horizontal direction; an image frame memory for storing weight data in a vertical direction; a constant generator for calculating weight data; an adder coupled to the image frame memories through a bus; a multiplier coupled to the image frame memories through a bus for multiplying the data between the image frame memories; an accumulator coupled to the adder and the multiplier through another bus for temporarily storing calculated results; and calculating means for calculating zero-order, primary, and secondary moments of the image data.

The zero-order moment is determined by adding the original image data stored in the image frame memory successively into the accumulator by using the adder.

The primary moment is determined by storing a 1 in the upper lefthand end of the image frame memory, generating data which are successively 2, 3, 4 and so on by adding a 1 to the previous data value so that subsequent neighboring locations to the righthand side produce the weight data, storing these weight data in the image frame memory which serves to store weight data in the horizontal direction, determining the products of the original image data stored in the image frame memory and the weight data with the multiplier, and finally adding the products with the accumulator.

The secondary moment is determined by generating horizontal weight data in the image frame memory which serves to store weight data in the horizontal direction, generating vertical weight data in the memory which serves to store weight data in the vertical direction, determining the products of pixels in these two image frame memories with the multiplier, storing the products in the image frame memory which serves to store weight data in the horizontal direction, determining the products of these weight data and original image data for the respective pixels with the multiplier, and finally adding the products with the accumulator.

BRIEF DESCRIPTION OF THE DRAWINGS

FIG. 2 is a diagram showing weight data in a horizontal direction; and

FIG. 3 is a diagram showing weight data in a vertical direction.

DESCRIPTION OF THE PREFERRED EMBODIMENT

Figure 1:
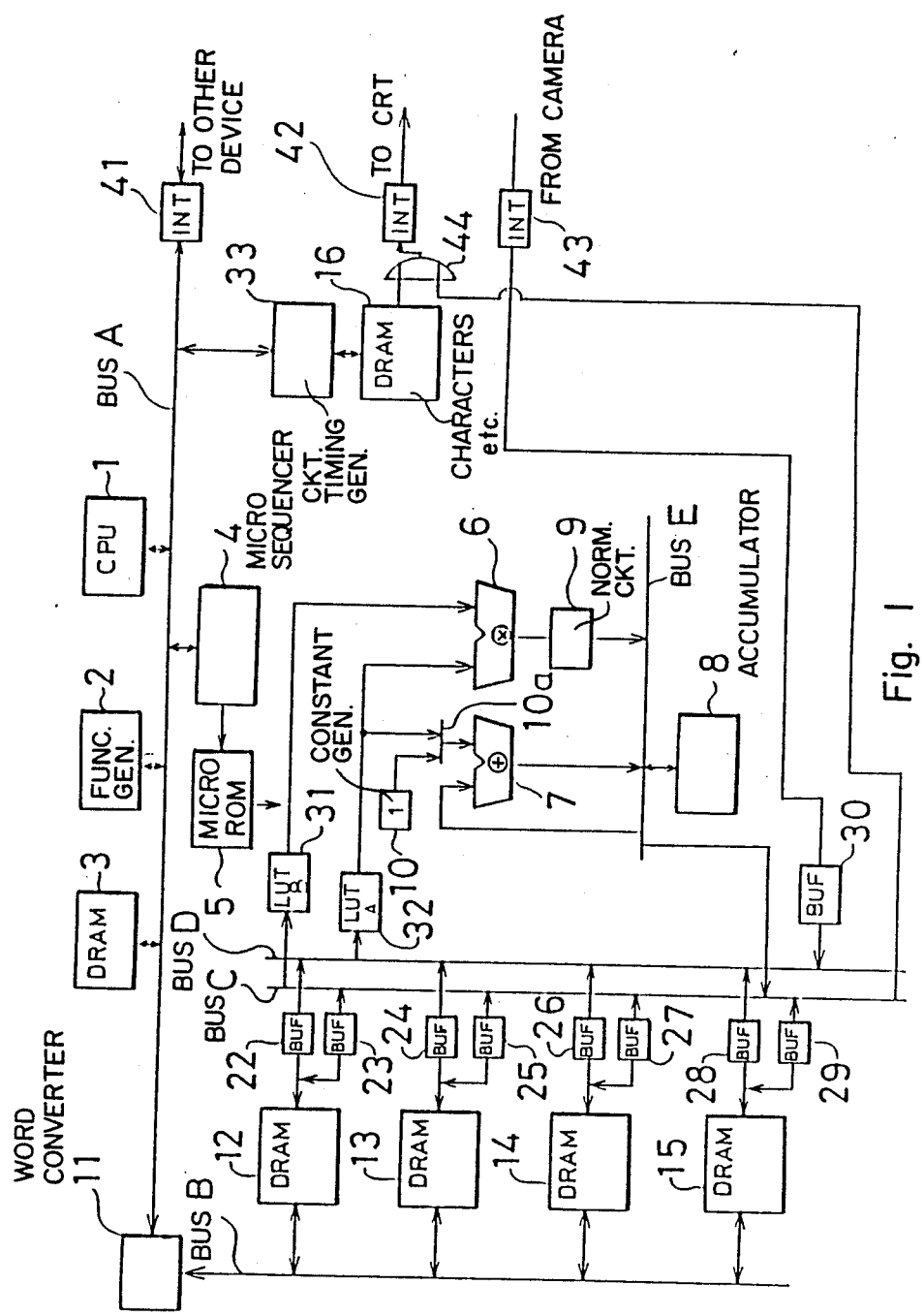
FIG. 1 is a block diagram of an embodiment of the present invention.

An embodiment of the present invention will hereinafter be described in specific detail with reference to the drawings.

FIG. 1 is a block diagram of an embodiment according to the present invention. Denoted at 1 is a central processing unit (CPU) for controlling a device in its entirety, 2 a function generator for calculating functions according to a command from the CPU 1, and 3 a main memory for writing and reading data under the control of the CPU 1. The main memory 3 comprises a D-RAM (dynamic RAM). The CPU 1, the function generator 2, and the main memory 3 are connected to a bus A via which commands and data are transmitted and received. Designated at 4 is a microsequencer and 5 a micro-ROM 5. The microsequencer 4 controls data calculations for processing images under the control of a program stored in the micro-ROM 5.

Denoted at 6 is a multiplier, 7 an adder, 8 an accumulator for temporarily storing calculated results, and 9 a normalizing circuit for normalizing multiplied results so that they will not overflow. Data is transferred to and from the multiplier 6, the adder 7, the accumulator 8, and the normalizing circuit 9 through a bus E. Indicated at 10 is a constant generator circuit for inputting a constant "1" at all times, and 10a is a selector. The circuit constant generator 10 and the selector 10a are operated under the control of the microsequencer 4 for calculating image data.

A word converter 11 converts data between the bus A and a bus B when the structures of words of the buses A and B are different from each other. For example, if the bus A has a 16-bit structure and the bus B has an 8-bit structure, then the word converter 11 converts data between these buses based upon the difference in data structure. Image frame memories 12, 13, 14, and 15 are in the form of D-RAMs. An original image to be processed is stored in the image frame memory 12. The original image is photographed by a camera (not shown) and converted to digital data, which are stored with each pixel being of 8 bits. The number of these bits may be increased or reduced as desired. The number of pixels is 256×256 with 256 horizontal pixel rows and 256 vertical pixel columns. As a result, the image frame memory required is of a storage capacity of 256×256×8=524288 bits.

The image frame memory 13 stores processed image data. The image frame memory 14 stores weight data in a horizontal direction, whereas the image frame memory 15 stores weight data in a vertical direction. The image frame memories 12 through 15 are coupled to the bus B, and can transfer data to and from the main memory 3 and an external control device through the bus A.

The image frame memories 12 through 15 are connected to buses C and D through buffers 22 through 29. These buses are coupled to the data calculating unit (described above) through the look-up tables 31, 32.

Processed data is transmitted to and received from an external control device through an interface 41. Any desired image data stored in the image frame memories 12 through 15 is transferred to a display unit (CRT) or the like through an image frame memory 16, an OR gate 44, and an interface 42 at a timing generated by a CRT timing generator 33. The data stored in the image frame memory 13 or the like may be output to the display unit (CRT) through the bus C, the OR gate 44, and the interface 42. The original image to be processed is photographed by the external camera, converted to digital data by an A/D converter (not shown), and transferred to the bus D through an interface 43 and a buffer 30.

Operation of the embodiment will now be described for the calculations of a zero-order moment, a primary moment, and a secondary moment. [Calculation of a zero-order moment]

The zero-order moment M of image data is defined by the following equation:

$$M0 = \sum_{i=1}^{256} \sum_{j=1}^{256} P_{i,j}$$

which is the sum of all pixel data. Therefore, it can be determined by the following calculation: The data stored in the image frame memory 12 is added, pixel by pixel, into the accumulator 8 through the buffer 22, the bus D, the look-up table 32, the selector 10a, the adder 7 and the bus E. After the data of all pixels has added, the content of the accumulator 8 contains the zero-order moment. The value of the zero-order moment is stored in the main memory 3 or the image frame memory 13. This calculation is controlled by the microsequencer 4 using the program stored in the microROM 5.

[Primary moment]

The primary moment M1 of image data is defined by the following equation:

$$M1x = \left( \sum_{i=1}^{256} \sum_{j=1}^{256} P_{i,j} \cdot i \right) / M0$$

which is the primary moment in the horizontal direction (X direction), indicating positional information of the object in the horizontal direction. Likewise, the primary moment in the vertical direction is defined by the following equation:

$$M1y = \left( \sum_{i=1}^{256} \sum_{j=1}^{256} P_{i,j} \cdot j \right) / M0$$

Figures 2, 3:
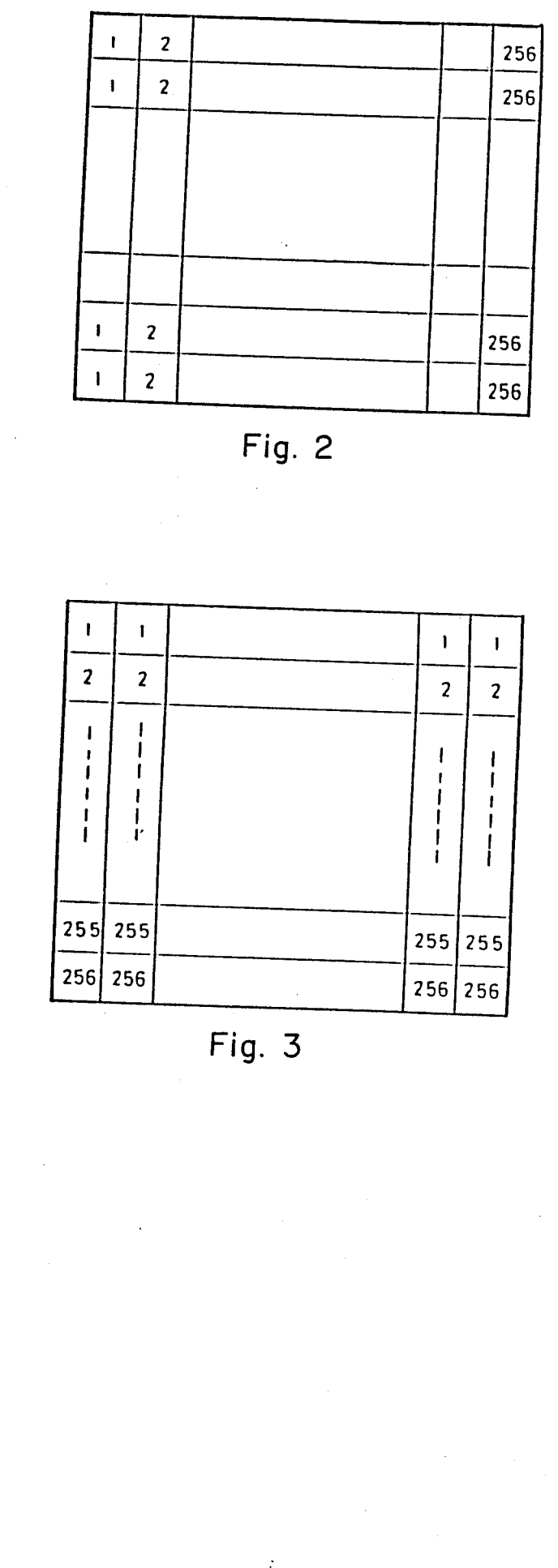

The primary moment in the horizontal direction will be described. First, weight data in the horizontal direction is generated. The contents of the image frame memory 14 are shown in FIG. 2. The constant generator 10 is rendered effective, and its output is added to the accumulator 8 by the adder 7. The content of the accumulator 8 becomes "1", which is written into the leftmost bit in the uppermost row, as shown in FIG. 2, of the image frame memory 14. Then, the content of the accumulator 8 and the constant "1" are added, and the sum is written into the accumulator 8. The content of the accumulator 8 then becomes "2", which is written into the second column from the left in the uppermost row. The above cycle is repeated until the numerical values 1~256 are written in the uppermost row. The data in the uppermost row are then copied into the second and following rows to complete the weight data illustrated in FIG. 2.

Then, the contents, indicative of the original image, of the image frame memory 12 and the contents, indicative of the weight data, of the image frame memory 14 are multiplied at the corresponding pixels by the multiplier 6, the output of which is then normalized by the normalizing circuit 9 because the numerical value produced by the multiplication is too large to be expressed in 8 bits. The normalized content of the normalizing circuit 9 is then stored in the accumulator 8, after which it is written into the positions of the corresponding pixels in the image frame memory 13. In this manner, the image frame memory 13 stores $$P_{i,j} \cdot i$$

This resulting data is then added and stored in the accumulator 8 in the same manner as when the zero-order moment is determined, thereby obtaining $$\sum_{i=1}^{256} \sum_{j=1}^{256} P_{i,j}$$

Finally, this is divided by the zero-order moment M0 which has been determined previously to obtain the primary moment in the horizontal direction $$M1x = \left( \sum_{i=1}^{256} \sum_{j=1}^{256} P_{i,j} \cdot i \right) / M0$$

Similarly, weight data in the vertical direction as shown in FIG. 3 is generated and determined, and from the determined weight data, the primary moment in the vertical direction can be determined as follows:

$$M1y = \left( \sum_{i=1}^{256} \sum_{j=1}^{256} P_{i,j} \cdot j \right) / M0$$

[Secondary moment]

The secondary moment of image data is defined by the following equation:

$$M2 = \left(\sum_{i=1}^{256}\sum_{j=1}^{256} P_{i,j} \cdot i \cdot j \right)/(M1x \cdot M1y)$$

In the same manner as when the primary moment is determined, the weight data in the horizontal direction as shown in FIG. 2 is determined, and the weight data in the vertical direction as shown in FIG. 3 is generated. Both of the weight data are then multiplied by the multiplier 6, and the product is stored into the image frame memory 14. Then, the products of the contents of the image frame memory 12 and the corresponding pixels of the image frame memory 14 are determined, and added altogether. The sum is thereafter divided by (M1x·M1y) thereby providing the secondary moment.

In this manner, the zero-order moment, the primary moment, and the secondary moment of image data can be calculated through a simple arrangement.

Although in the above embodiment the data is calculated using a microprogram executed by the microsequencer, the data can be calculated by other hardware.

With the present invention, as described above, the constant adding circuit, the multiplier, the accumulator, and others are combined to provide a circuit necessary for calculating the moments. Therefore, the zero-order, primary, and secondary data of image moments can be calculated at high speed by a simple circuit.

I claim:

1. A device for calculating a zero-order moment, a primary moment, and a secondary moment of image data, said device comprising:
    storage means for storing frames of data, the data including image data, processed image data, and weight data, said storage means comprises:
        a first image frame memory for storing the image data;
        a second image frame memory for storing the processed image data;
        a third image frame memory for storing the weight data in a horizontal direction; and
        a fourth image frame memory for storing the weight data in a vertical direction;
    an adder, operatively connected to said storage means, for calculating the zero-order, primary, and secondary moments as well as for calculating the weight data;
    a multiplier, operatively connected to said storage means, for multiplying the data stored in said storage means;
    an accumulator, operatively connected to said adder and said multiplier, for temporary storage of the processed image data;
    a constant generator, operatively connected to said adder, for generating a constant used in calculating the weight data;
    a normalizing circuit, operatively connected to said multiplier, for normalizing results of said multiplier to prevent overflow;
    a first bus operatively connected to said adder, said multiplier, and said first, second, third and fourth image frame memories;
    a second bus operatively connected to said adder, said multiplier, and said accumulator; and
    control means for controlling the calculations of the zero-order moment, the primary moment, and the secondary moment of the image data.

2. A device according to claim 1, wherein said control means comprises a microsequencer controlled by a microprogram.

3. A device for calculating a zero-order moment, a primary moment, and a secondary moment of image data, said device comprising:
    a first image frame memory for storing original image data composed of a plurality of pixels arranged in a matrix in vertical and horizontal directions;
    a second image frame memory for storing processed image data obtained after the original image data is subjected to a predetermined processing;
    a third image frame memory for storing weight data in the horizontal direction corresponding to the pixels of the original image data;
    a fourth image frame memory for storing weight data in the vertical direction corresponding to the pixels of the original image data;
    an accumulator for temporarily storing a result of a calculation;
    a constant generator for generating a constant used in calculating the weight data in the horizontal and vertical directions for said third and fourth image frame memories, respectively;
    a multiplier, operatively connected with said first, second, third, and fourth image frame memories and said accumulator, for calculating a product of pixels of any two of said first, second, third, and fourth image frame memories and storing the product in said accumulator;
    a selector, operatively connected to said first, second, third, and fourth image frame memories and said constant generator, for selecting one among said image frame memories and said constant generator;
    an adder, operatively connected to said selector and said accumulator, for adding the pixels of the one of said first, second, third, and fourth image frame memories selected by said selector with the result in said accumulator when said selector selects any of said image frame memories, and calculating the weight data in the horizontal and vertical directions using said constant generator and said accumulator when said selector selects said constant generator;
    a first bus operatively connected to said adder, said multiplier, and said first, second, third and fourth image frame memories;
    a second bus operatively connected to said adder, said multiplier, and said accumulator; and
    calculation means for
        controlling calculation of the zero-order moment by adding all of the pixels of said first image frame memory using said adder and said accumulator when said selector selects said first image frame memory,
        controlling calculation of the primary moment by calculating the weight data in the horizontal and vertical directions using said adder and said accumulator with storage of the weight data in said third and fourth image frame memories when said selector selects said constant generator, and calculating a first product of the pixels of said first image frame memory and the pixels of one of said third and fourth image frame memories using said multiplier with storage of the first product in said second image frame memory, and controlling calculation of the secondary moment by calculating the weight data in the horizontal and vertical directions using said adder and said accumulator with storage of the weight data in said third and fourth image frame memories when said selector selects said constant generator, calculating a second product of the pixels of said third image frame memory and the pixels of said fourth image frame memory using said multiplier with storage of the second product in said second image frame memory, and calculating a third product of the pixels of said first image frame memory and the pixels of said second image frame memory using said multiplier with storage of the third product in said second image frame memory.

4. A device according to claim 3, further comprising a normalizing circuit, operatively connected to said multiplier, for normalizing results of said multiplier to prevent overflow.

5. A device according to claim 4, wherein said control means comprises a microsequencer controlled by a microprogram.

6. A device for calculating a zero-order moment, a primary moment, and a secondary moment of image data, said device comprising:

storage means for storing frames of data, the data including image data, processed image data, and weight data;

an adder, operatively connected to said storage means, for calculating the zero-order, primary, and secondary moments as well as for calculating the weight data;

a multiplier, operatively connected to said storage means, for multiplying the data stored in said storage means;

an accumulator, operatively connected to said adder and said multiplier, for temporary storage of the processed image data;

a constant generator, operatively connected to said adder, for generating a constant used in calculating the weight data;

a first bus operatively connected to said adder, said multiplier, and said storage means;

a second bus operatively connected to said adder, said multiplier, and said accumulator; and control means for controlling the calculations of the zero-order moment, the primary moment, and the secondary moment of the image data.

7. A device according to claim 6, further comprising a normalizing circuit, operatively connected to said multiplier, for normalizing results of said multiplier to prevent overflow.

8. A device according to claim 7, wherein said control means comprises a microsequencer controlled by a microprogram.

* * * * *

UNITED STATES PATENT AND TRADEMARK OFFICE
CERTIFICATE OF CORRECTION

PATENT NO. : 4,949,282
DATED : August 14, 1990
INVENTOR(S) : Yutaka Muraoka

It is certified that error appears in the above-identified patent and that said Letters Patent is hereby corrected as shown below:

On the title page:

In section [30] Foreign Application Priority Data, change "61-269447" to --61-269446--;

In Section [56] References Cited, change "372/41" to --382/41--; and

In section [57] ABSTRACT, line 6, after "in" insert --horizonal and vertical directions. The device also--.

Col. 1, line 7, after "for" insert --calculating--;
       line 23, change "Hence" to --Hence,--.

Col. 2, line 51 after "and" insert --at--, and delete "circuit";
       line 52, after "generator" insert --circuit--.

Col. 3, line 47, after "has" insert --been--; and
       line 48, delete "the contents of".

Col. 4, line 38, change "Pi,j·i" to --$P_{i,j} \cdot i$--; and

UNITED STATES PATENT AND TRADEMARK OFFICE
CERTIFICATE OF CORRECTION

| | |
|---|---|
| PATENT NO. : | 4,949,282 |
| DATED : | August 14, 1990 |
| INVENTOR(S) : | Yutaka Muraoka |

It is certified that error appears in the above-identified patent and that said Letters Patent is hereby corrected as shown below:

Col. 4, line 45, change "$P_{i,j}$" to --$P_{i,j} \cdot i$--.

Signed and Sealed this

Twenty-sixth Day of November, 1991

Attest:

HARRY F. MANBECK, JR.

*Attesting Officer*      *Commissioner of Patents and Trademarks*